(12) United States Patent
Payne

(10) Patent No.: US 9,346,223 B2
(45) Date of Patent: May 24, 2016

(54) APPARATUS FOR AND METHOD OF INHIBITING DELAMINATION

(75) Inventor: Christopher Gordon Thomas Payne, Bristol (GB)

(73) Assignee: Airbus Operations Limited, Bristol (GB)

(*) Notice: Subject to any disclaimer, the term of this patent is extended or adjusted under 35 U.S.C. 154(b) by 730 days.

(21) Appl. No.: 12/225,314

(22) PCT Filed: Apr. 12, 2007

(86) PCT No.: PCT/GB2007/001335
§ 371 (c)(1),
(2), (4) Date: Sep. 18, 2008

(87) PCT Pub. No.: WO2007/128997
PCT Pub. Date: Nov. 15, 2007

(65) Prior Publication Data
US 2010/0224084 A1    Sep. 9, 2010

(30) Foreign Application Priority Data
May 9, 2006 (GB) .................................. 0609166.4

(51) Int. Cl.
*B29C 70/54* (2006.01)
*B29C 65/00* (2006.01)
*B29K 105/06* (2006.01)

(52) U.S. Cl.
CPC ........... *B29C 70/54* (2013.01); *B29C 66/43421* (2013.01); *B29C 66/721* (2013.01); *B29C 66/72141* (2013.01); *B29K 2105/06* (2013.01); *Y02T 50/433* (2013.01)

(58) Field of Classification Search
CPC ............................. B64C 3/185; B29C 66/721
USPC ............. 403/231; 244/123.1, 123.8, 131, 132
See application file for complete search history.

(56) References Cited

U.S. PATENT DOCUMENTS

| 4,219,980 A | * | 9/1980 | Loyd ............................. 52/309.1 |
| 4,396,173 A | * | 8/1983 | Call, Sr. ......................... 248/188 |
| 4,813,720 A | | 3/1989 | Cassel |
| 4,985,195 A | | 1/1991 | Wilson et al. |
| 5,499,782 A | * | 3/1996 | Domine ......................... 244/1 A |
| 5,589,015 A | | 12/1996 | Fusco et al. |
| 5,827,383 A | * | 10/1998 | Campbell et al. ............ 156/73.1 |

(Continued)

FOREIGN PATENT DOCUMENTS

| DE | 24 18 597 | 1/1975 |
| EP | 1 010 615 | 6/2000 |

(Continued)

OTHER PUBLICATIONS

International Search Report for PCT/GB2007/001335, mailed Jul. 4, 2007.

(Continued)

*Primary Examiner* — Joshua Kennedy
(74) *Attorney, Agent, or Firm* — Nixon & Vanderhye, P.C.

(57) ABSTRACT

A compression apparatus for compressing a curved region of a laminated element 2 having a first surface region following a first curved path and a second surface region opposed to the first surface region following a second curved path, wherein a first compression member 40 is placed against the first surface region and urged towards a second compression member 50 placed against the second surface region.

19 Claims, 4 Drawing Sheets

(56) References Cited

U.S. PATENT DOCUMENTS

| | | | | |
|---|---|---|---|---|
| 5,845,872 | A * | 12/1998 | Pridham et al. | 244/1 A |
| 6,415,496 | B1 * | 7/2002 | Dominguez Casado et al. | 29/525.01 |
| 6,579,033 | B2 * | 6/2003 | Ajiki | 403/403 |
| 7,050,286 | B2 * | 5/2006 | Pridham et al. | 361/218 |
| 7,387,277 | B2 * | 6/2008 | Kordel et al. | 244/123.5 |
| 7,651,320 | B2 * | 1/2010 | Hansen | 416/1 |
| 7,770,846 | B2 * | 8/2010 | Perez Rodriguez et al. | 244/209 |
| 2006/0032982 | A1 * | 2/2006 | Stephens | 244/131 |
| 2008/0258008 | A1 * | 10/2008 | Cooper | 244/131 |
| 2010/0243810 | A1 * | 9/2010 | Lobo Barros et al. | 244/131 |
| 2010/0308170 | A1 * | 12/2010 | Hadley et al. | 244/131 |

FOREIGN PATENT DOCUMENTS

| | | |
|---|---|---|
| FR | 2 360 777 | 7/1976 |
| GB | 5 841 77 | 1/1947 |
| WO | WO 03/101688 | 12/2003 |

OTHER PUBLICATIONS

Written Opinion for PCT/GB2007/001335, Jul. 4, 2007.
Great Britain Search Report for GB Application No. 0609166.4 dated Jul. 18, 2006.

* cited by examiner

APPARATUS FOR AND METHOD OF INHIBITING DELAMINATION

This application is the U.S. national phase of International Application No. PCT/GB2007/001335, filed 12 Apr. 2007, which designated the U.S. and claims priority to British Patent Application No. 0609166.4 filed 9 May 2006, the entire contents of each of which are hereby incorporated by reference.

FIELD OF THE INVENTION

The present invention relates to an apparatus for and method of compressing a curved region of a laminated element or structure so as to protect the element or structure against delamination.

BACKGROUND OF THE INVENTION

Fibre reinforced laminates offer considerable advantages in terms of stiffness and durability when compared to many existing metallic materials. As such they have found widespread use in many industries, and notably within the manufacture of aircraft where the weight of the structure is of critical importance. There are, however, several intricacies when designing components of fibre reinforced laminates. A predominant design consideration stems from the fact that, within a final product, much of the load bearing performance is derived from the alignment of the fibres within the structure. In general, the structures are engineered such that the primary loads to be born by the structure act in a longitudinal direction of layers of fibres.

A laminated structure is generally laid up by building up one layer of fibres on preceding layers of fibres. Within each layer of fibre, all of the fibres run in the same direction. That is to say, each layer is not a weave of warp and weft fibres as this necessarily puts a crinkle in the fibres which reduces their ability to resist compressive loads. Alternate layers are laid in different directions, generally at 90° to one another, in order to produce a component. However, if one considers, for simplicity, a planar panel made up of such layers of laminated material, it can be seen that the panel can be made relatively strong with regards to forces acting in the plane of the panel, but there are no fibres running perpendicular to the plane of the panel. Therefore the panel would be relatively weak in response to tension seeking to separate the layers of the panel from one another. This limitation is generally not significant when considering the construction of planar elements, but becomes more significant when a laminated element has a curve formed therein.

SUMMARY OF THE INVENTION

According to a first aspect of the present invention there is provided a combination of a laminated element; and compression apparatus for compressing a curved region of the laminated element having a first surface region following a first curved path and a second surface region opposed to the first surface region following a second curved path, wherein the compression apparatus comprises a first compression member which is placed against the first surface region and urged towards a second compression member placed against the second surface region.

It is thus possible to clamp a curved region of a laminated element between first and second compression members, which effectively act as jaws of a clamp, so as to ensure that the fibres in the curved portion of the laminated element are always held in compression with respect to an adjacent layer of fibres for loads less than a predetermined maximum load.

Typically the curved region of the laminated element is defined so as to form an interface between a wall of the element and a flange such that the laminated element can be secured to an adjacent element. The curved region may form a part cylindrical surface which may extend for some considerable distance. Advantageously the first and second compression members are elongate members such that one or more members may be placed against each of the first and second surface regions in order to protect the curved region of the laminated element over a substantial portion, and preferably all, of its length.

Advantageously at least one fastener extends, in tension, between the first and second compression members such as to urge them towards one another and thereby to clamp the curved region of the laminated element therebetween.

The combination may further comprise a second element which can be joined to the laminated element by a fastener such as a screw, bolt, rivet or adhesive. Typically the laminated element has a flange which can be joined to the second element. Preferably the flange is adapted to lie substantially parallel with a surface of the second element.

Typically the curved portion has a concave face on a first side of the laminated element, and a convex face on a second side of the laminated element, and the second element is adapted to be joined to the laminated element on its second side.

According to a second aspect of the present invention there is provided a method of protecting a curved region of a laminated element against delamination, the method comprising placing a first member against a first surface of the curved region and placing a second member against a second surface of the curved region, said first and second surfaces being on opposed sides of the curved region, and urging the first and second members together so as to place the curved region therebetween under compression.

BRIEF DESCRIPTION OF THE DRAWINGS

The present invention will further be described, by way of example only, with reference to the accompanying drawings, in which.

DESCRIPTION OF PREFERRED EMBODIMENTS OF THE PRESENT INVENTION

Figure 1:
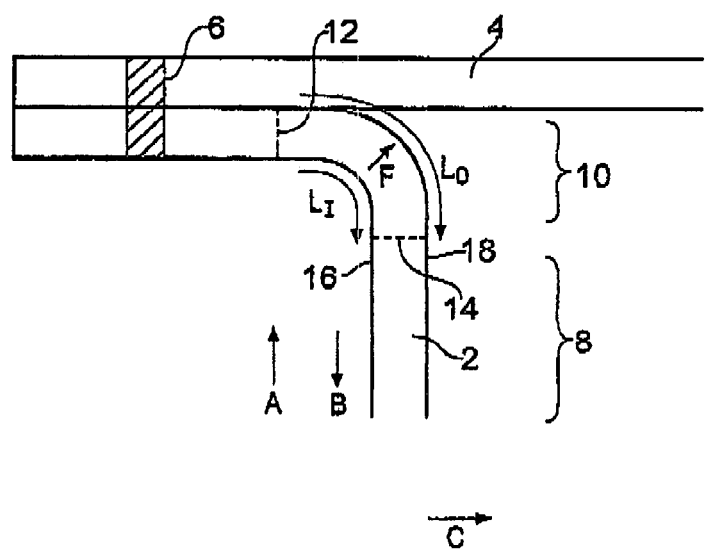
FIG. 1 schematically illustrates how forces acting within the plane of a first laminated element can give rise to delamination forces in a curved region of that element.

FIG. 1 schematically illustrates an interface between a first laminated element, generally designated 2 and a second element 4. The second element 4 may or may not be laminated. The elements 2 and 4 are attached together by a plurality of fasteners, of which one fastener 6 is shown for simplicity. The fastener may be any suitable fastener for holding the elements 2 and 4 together in order to resist relative motion therebetween in response to loads acting between the elements 2 and 4. Suitable fasteners may include, without limitation, screws, bolts, rivets and adhesive. The element 2 has a curved region 10 with a concave face on a first side of the element 2, and a convex face on a second side of the element 2. The element is 4 joined to the element 2 on its second side (that is, on the same side as the convex face). Suppose, for the sake of discussion, the fastener 6 is a bolt, optionally with a counter sunk head so as to leave a smooth outer surface, and that a load is expected to act in the directions A or B such that the load is substantially perpendicular to the panel 4 and acts substantially within the plane of a non-curved region 8 of the panel 2. However it will be seen that in the curved region, generally designated 10, of the panel 2 then the forces within the panel will not lie along the local axis of the fibres within the panel.

Although the panel 2 is solid, it is instructive to consider the effects of a load acting only on the innermost and outermost surfaces of the panel 2. The curved region of the panel can be considered as extending between a first chain line 12 and a second chain line 14. It could be seen that the length, $L_1$, of the fibres extending between the lines 12 and 14 on an innermost surface 16 of the panel is less than the distance $L_o$ of fibres extending between the same lines 12 and 14 on an outermost surface 18 of the panel.

It can be seen, intuitively, that if a force where to act along the direction C so as to attempt to straighten the curved region 10 of the panel, then as the curve was removed from the panel, that is to say the curve is "opened" out from its manufactured angle, the distances between the lines 12 and 14 along the inner surface and outer surface would tend to equalise. However the fibres resist extension or compression and this gives rise to a force, acting along the direction of arrow F, which urges the adjacent layers of the composite material to separate from one another. This force is referred to as a "through thickness" tensile load and places the resin holding adjacent layers of the laminate into tension, and if the forces exceed the tensile strength of the resin then the laminated product will delaminate. The matrix of material within the laminate is not reinforced along directions normal to its surface, and hence its ability to resist this delaminating force is poor compared to the strength within the local plane of the laminated product. It is less intuitive, but nevertheless a fact, that the forces acting in the directions A or B will also give rise to similar effects as the force will act either to open or close the curve from its manufactured shape and can give rise to both actions occurring simultaneously at different points of the curve. The reader may observe this by folding a pad of paper to follow a curved path similar to that shown in FIG. 1, then applying forces along directions A or B, as appropriate. As the forces are applied (bearing in mind that position of the planar portion 8 of the panel 2 is generally inhibited from moving laterally) then the radii of curvature change slightly leading to parts of the curve experiencing compressive forces acting between the inner and outer faces and other parts of the curve experiencing tensile forces acting between the inner and outer faces.

Figure 2:
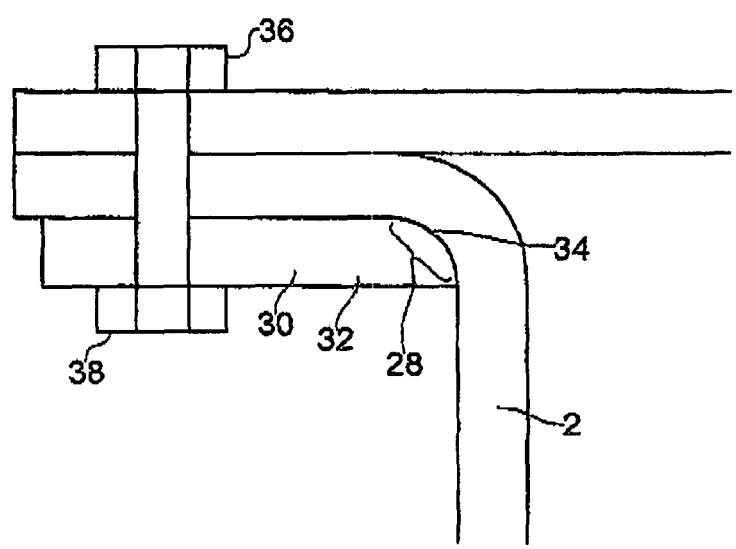
FIG. 2 shows a prior art solution.

This problem of controlling internal loads generated within a corner radius of a laminate structure reacting against an applied load is known and solutions have been proposed in the prior art so as to overcome this. One such solution is the inclusion of individual washers which extend from the fastener, into the "throat" 28 of the corner radii, as shown in FIG. 2, in an attempt to transfer the load closer to the planar (vertical section shown in FIG. 2) of the joint. Thus, in this example, the washer 30 has a non-circularly symmetric profile and has a portion 32 which extends towards the curved surface 34 of the laminated element 2. The washer is profiled so as to match the curved surface 34 thereby transferring the load into the vertical section of the laminated element. In FIG. 2 the washer and the elements 2 and 4 are shown as being held together by a bolt 36 cooperating with a nut 38. This solution can be seen to be only partially successful, and can only be applied to joints having through fasteners such as bolts or screws. It does not work with bonded joints.

A further prior art attempt to protect the curved region of the element 2 against delamination is to insert "Z pins" through the laminated material. These are effectively short sections of fibre which extend substantially perpendicular to the normal of the local surface of the laminated element in an attempt to increase its strength in the direction perpendicular to the local surface. However the Z pins are themselves only secured to the laminated structure by the resin used to bond the structure together and consequently the maximum force which can be absorbed by a Z pin varies as a function of distance from the surface of the laminated structure. This is because, as with any fibre reinforced material, the efficiency of the reinforcement is proportional to the length of the fibres. Thus, within a thin section of laminate, Z pins are not long enough to fully absorb and react against the load tending to delaminate the material. Additionally when Z pins are inserted into the laminate they create a distortion of the existing fibres which can lead to performance for degradation within the laminate as a whole and which degradation is also proportional to the thickness of the laminate.

In order to avoid the risk of delamination, the inventor has realised that the curved portion of the laminated structure should be preloaded into compression such that adjacent layers of the laminated structure are forced towards one another. As a consequence of this internal forces within the structure tending to urge the adjacent layers apart now have to act against the compressive preload thereby absorbing all (or at least substantially reducing) the through thickness loads generating by any "opening" of the corner.

In order to provide a preload a first compression member 40 is provided on the convex side of the curved region 10 of the member 2, and a second compression member 50 is placed on the concave side of the curved region. The first compression member has a generally cylindrical-concave surface 42 adapted to closely match the corresponding radius of curvature of the convex outer face 18 of the member 2. Advantageously any manufacturing tolerances should be set such that the radius of curvature of the concave face is marginally greater than the radius of curvature of the convex outer face 18 in the curved region such that any gap therebetween may be filled with a filler, such as a resin and particulate mix, thereby ensuring uniform load transfer between the first compression member 40 and the outermost face 18 of the laminated element.

Figure 4:
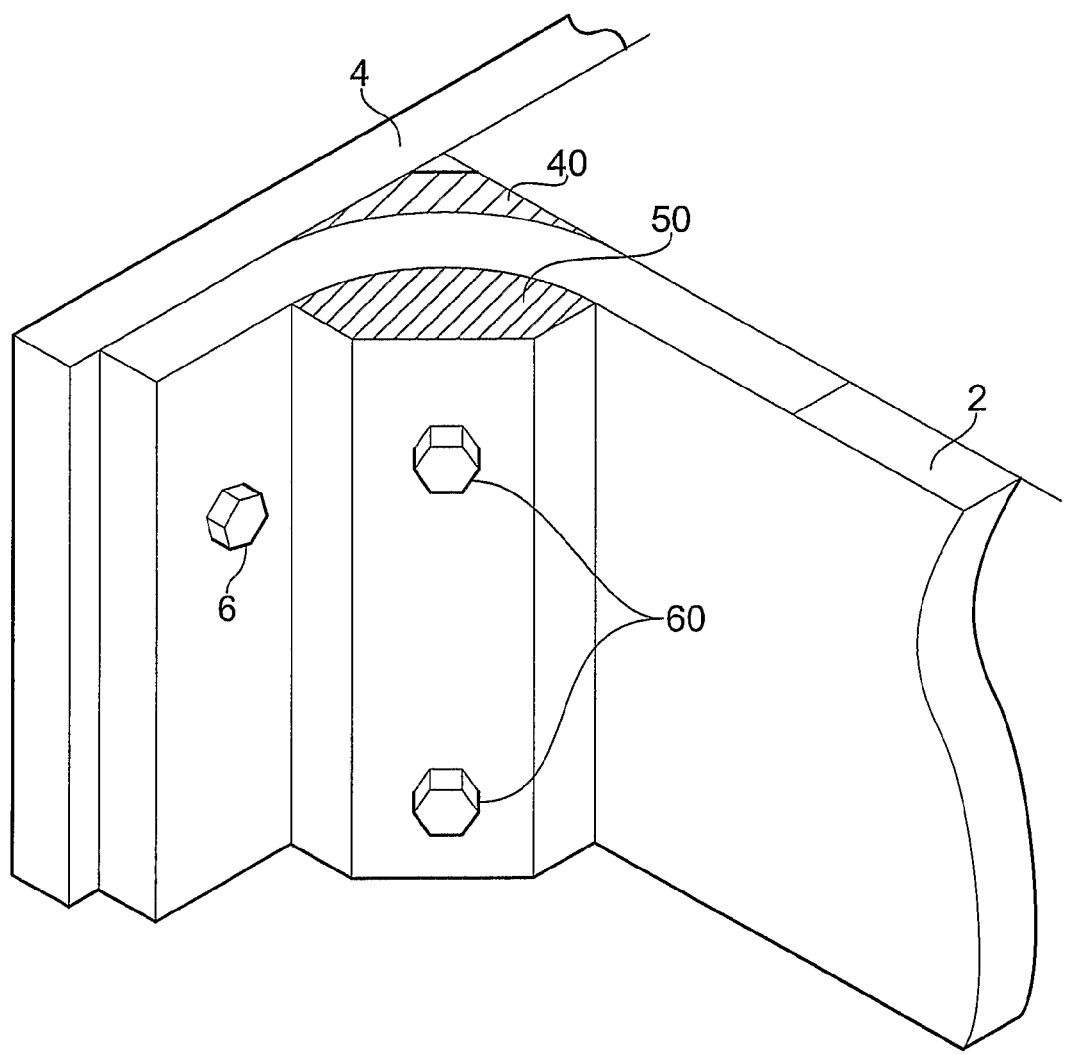
FIG. 4 is a perspective view showing the apparatus of FIG. 3 in use so as to facilitate joining of a wing spar to a wing surface.

The second compression member 50 has a cylindrical convex face 52 which substantially matches the radius of curvature of the inwardly directed concave curved surface 54 of the element 2. Here any manufacturing tolerance should err on the side of the convex surface having a slightly smaller radius of curvature than the concave surface 54 such that any gaps therebetween can be filled with a filler. The first and second compression members may be elongate extrusions, as shown in FIG. 4. The first and second compression members are urged into engagement with the respective cooperating surfaces of the laminated element 2 by a plurality of fasteners 60 which extend under tension through respective channels, such as drill holes, extending through the first compression member 40, the second compression member 50 and the curved portion of the laminated structure disposed therebetween.

Figure 3:
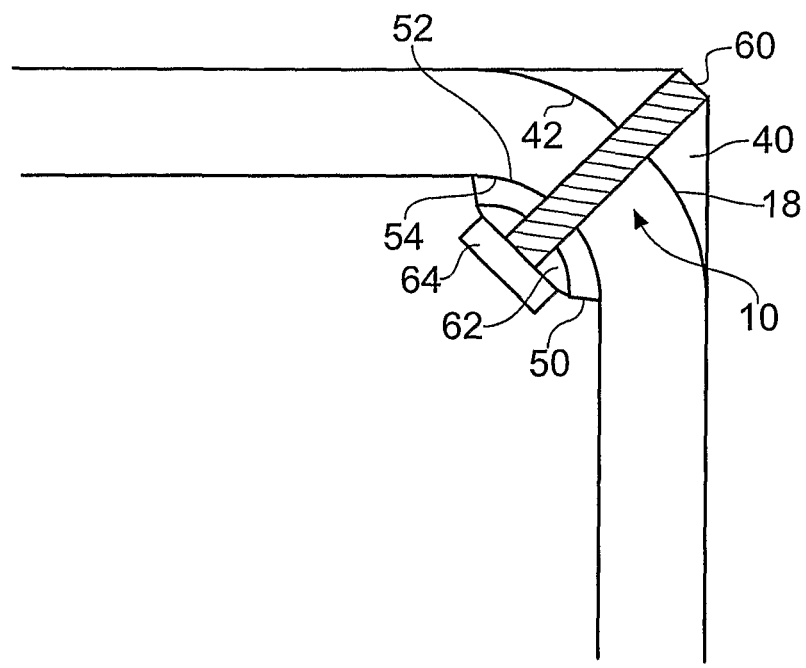
FIG. 3 is a plan view of a compression apparatus constituting an embodiment of the present invention.

The or each tension fastener may, for example, be a bolt or a screw. The bolt may engage with an externally provided nut or may engage with a threaded portion of one of the compression members. As shown in FIG. 3 a washer 62 may be disposed between a head of a bolt 64 and either one of the compression members 40 or 50, as appropriate, in this example the second compression member 50, so as to spread the compressive forces more evenly within the compression members 40 and 50. The first compression member 40 shown in FIG. 3 is provided with an internally threaded face in the passage therein so as to engage with the threads on the bolt.

The compression members 40 and 50 may be made out of any suitable material, and thus for example could be formed out of an extruded metal. Aluminium represents a suitable candidate material. However, they can conveniently be made from fibre reinforced laminate with the longitudinal direction of the fibres being parallel to the longitudinal axis of the compression member (that is up and down the direction shown in FIG. 4). Making the compression members from fibre reinforced laminate has the advantage of reducing galvanic corrosion of the metal fixings used to secure the compression members either side of the laminated element 2.

The compression members can be regarded as reinforcement elements and can themselves aid the interface with the joint itself. Thus, if we look at FIG. 4, the compression member 40 abuts the element 4 and as such can aid load transfer between element 2 and element 4. Furthermore, if adhesive is used between compression member 40 and elements 2 and 4, then the overall strength of the joint is increased.

The placement (number, size and interfastener distance) of the fasteners 60 is determined by the local loads—and hence the degree of preload required. Consequently similar size compression members can be used over widely varying load ranges provided that an appropriate number of fasteners are used for the expected load.

The compression members are placed around the element 2 after the element has been formed—and preferably after the resin has cured. Thus the action of drilling the through holes does not disrupt the fibre alignment within laminate—except in the region of the hole itself. As a result of the overall integrity of the laminated component is not too adversely affected, and the performance of the combination of the component 2 and its compression arrangement should be significantly better than that of an equivalent unmodified component 2 alone.

The invention is particularly suited for use in the aerospace sector. The element 2 may, for example, be a spar within an aircraft wing that extends between upper and lower wing surfaces, in which case element 4 may form either the uppermost or lowermost surface of a wing (and the Figure would be re-orientated as appropriate).

The invention claimed is:

1. An aerodynamic component of an aircraft comprising:
   an aerodynamic panel having a first surface forming a portion of an outer surface of the aircraft and a second surface opposite to the first surface;
   a laminated spar including a flange attached to the second surface;
   a curved region of a laminated spar, wherein the curved region includes a first curved surface forming a first arc and a second curved surface opposite to the first curved surface;
   the laminated spar includes a first planar surface adjacent the first curved surface;
   a first compression member abutting the first curved surface, wherein the first compression member includes a curved surface covering and extending an entirety of the first arc of the first curved surface, and a side of the first compression member opposite to the curved surface includes a first planar surface in a plane of the first planar surface of the laminated spar;
   a second compression member abutting the second curved surface, and
   a fastener passing through the first and second compression members and the curved region of the laminated spar, wherein the fastener is under tension and urges the first compression member towards the second compression member thereby compressing the curved region of the laminated spar.

2. The aerodynamic component of claim 1 wherein the aerodynamic panel is a wing panel.

3. The aerodynamic component of claim 1 wherein the first compression member includes a surface adjacent the second surface of the aerodynamic panel.

4. The aerodynamic component of claim 1 wherein the first planar surface of laminated spar is a surface of the flange of the laminated spar.

5. The aerodynamic component of claim 1 wherein the first compression member includes a concave surface adapted to seat on the first curved surface, wherein the first curved surface is a convex surface.

6. The aerodynamic component of claim 1 wherein the second compression member includes a convex surface adapted to seat on the second curved surface, and the second curved surface is a concave surface.

7. The aerodynamic component of claim 1 wherein at least one of the first and second compression members has a threaded bore therein for engaging with a threaded region of the fastener.

8. The aerodynamic component of claim 1 wherein the fastener includes a shaft and a head at one end of the shaft, wherein the shaft extends through openings in the first and second compression members, and through an opening in the curve region of the laminated spar, and the head abuts against a rim of one of the openings in the first and second compression members.

9. The aerodynamic component of claim 1 wherein the second compression member is adjacent the flange of the laminated spar.

10. The aerodynamic component of claim 1 wherein the flange lies substantially parallel with the second surface of the aerodynamic panel.

11. The aerodynamic component of claim 1 further comprising another fastener joining the flange of the laminated spar to the aerodynamic panel.

12. The method of claim 1 wherein the side of the first compression member opposite to the curved surface includes a second planar surface in a plane of a second planar surface of the laminated spar.

13. A method comprising:
   joining a flange of a laminated spar to an inside surface of an aerodynamic panel having an outside surface;
   positioning a curved surface of a first compression member against a convex surface of a curved region of a laminated spar such that the curved surface of the first compression member extends an entirety of an arc formed by the convex surface;
   positioning a first planar surface of the first compression member in a plane of a first planar surface of the laminated spar, wherein the first planar surface is on a side of the first compression member opposite to the curved surface;
   positioning a second compression member against a concave surface of the curved region of the laminate spar, wherein the concave surface is opposite the convex surface;

inserting a shaft of a fastener through the first and second compression members and the curved region of the laminated spar, securing a first end region of the fastener to the first compression member and a second end region of the fastener to the second compression member, and placing the fastener under tension to urge the first compression member towards the second compression member and thereby compress the curved region of the laminated spar.

14. The method of claim 13 wherein the positioning steps include placing a concave surface of the first compression member against the convex surface of the curved region of the laminated spar and placing a convex surface of the second compression member against a concave surface of the curved region.

15. The method of claim 13 wherein joining the flange to the aerodynamic panel includes seating a surface of the flange on the inside surface of the aerodynamic panel.

16. The method of claim 13 further comprising positioning the first compression member adjacent the inside surface of the aerodynamic panel.

17. The method of claim 13 wherein the aerodynamic panel is a wing panel and joining the flange includes joining the flange to the wing panel.

18. The method of claim 13 further comprising positioning the second compression member adjacent the flange of the laminated spar.

19. The method of claim 13 wherein the first compression member has a second planar surface in a plane of a second planar surface of the laminated spar.

* * * * *